(12) United States Patent
Jung

(10) Patent No.: US 8,442,762 B2
(45) Date of Patent: May 14, 2013

(54) METHOD FOR THE THREE-DIMENSIONAL REPRESENTATION OF A DIGITAL ROADMAP

(75) Inventor: Thomas Jung, Bielefeld (DE)

(73) Assignee: Robert Bosch GmbH, Stuttgart (DE)

( * ) Notice: Subject to any disclaimer, the term of this patent is extended or adjusted under 35 U.S.C. 154(b) by 860 days.

(21) Appl. No.: 11/918,995

(22) PCT Filed: Mar. 31, 2006

(86) PCT No.: PCT/EP2006/061216
§ 371 (c)(1),
(2), (4) Date: Oct. 26, 2009

(87) PCT Pub. No.: WO2006/111461
PCT Pub. Date: Oct. 26, 2006

(65) Prior Publication Data
US 2010/0063728 A1   Mar. 11, 2010

(30) Foreign Application Priority Data
Apr. 19, 2005   (DE) .......................... 10 2005 018 082

(51) Int. Cl.
*G01C 21/30* (2006.01)
*G01C 21/32* (2006.01)

(52) U.S. Cl.
USPC ........... 701/436; 701/432; 701/439; 701/459; 715/850; 715/848

(58) Field of Classification Search .................. 701/418, 701/428, 436, 438, 439, 454, 458, 459, 432; 715/850, 715/848, 855
See application file for complete search history.

(56) References Cited

U.S. PATENT DOCUMENTS

| | | | |
|---|---|---|---|
| 5,072,396 A * | 12/1991 | Fitzpatrick et al. ........... 701/409 |
| 6,011,494 A | 1/2000 | Watanabe et al. |
| 6,272,431 B1 * | 8/2001 | Zamojdo et al. .............. 701/454 |
| 6,611,753 B1 | 8/2003 | Millington |
| 6,952,661 B2 * | 10/2005 | Agrawala et al. ................ 703/2 |
| 7,353,110 B2 * | 4/2008 | Kim .............................. 701/438 |
| 7,933,395 B1 * | 4/2011 | Bailly et al. ............. 379/201.04 |
| 2003/0060971 A1 * | 3/2003 | Millington et al. ........... 701/206 |
| 2005/0134716 A1 * | 6/2005 | Vice ......................... 348/333.02 |
| 2006/0052132 A1 * | 3/2006 | Naukkarinen et al. ..... 455/556.1 |
| 2008/0195315 A1 * | 8/2008 | Hu et al. ....................... 701/212 |

FOREIGN PATENT DOCUMENTS

| EP | 0 747 863 | * 12/1996 |
|---|---|---|
| EP | 0 802 516 | * 10/1997 |
| EP | 1 085 299 | * 3/2001 |

* cited by examiner

*Primary Examiner* — Paul N Dickson
*Assistant Examiner* — George Spisich
(74) *Attorney, Agent, or Firm* — Kenyon & Kenyon LLP

(57) ABSTRACT

In order to provide a method for the three-dimensional representation of a digital roadmap, which makes greater use of areas near the horizon of the visual representation and provides the user with supplementary information, a provision is made to draw in these areas navigation or orientation-related information as image elements.

21 Claims, 4 Drawing Sheets

METHOD FOR THE THREE-DIMENSIONAL REPRESENTATION OF A DIGITAL ROADMAP

FIELD OF THE INVENTION

The present invention relates to a method for the three-dimensional representation of a digital roadmap as well as to a navigation device.

BACKGROUND INFORMATION

Navigation devices are known from the related art, in which a part of a roadmap is represented on a screen as a function of the position of a vehicle and its direction of motion. In this context, different types of representation are customary, which can be divided into different categories with respect to the data structures on which they are based and the computing operations carried out by the system. The simplest model is a two-dimensional representation of a vector map containing the navigational data (surfaces, lines, dots, labels). In order to provide the driver of the vehicle with visual information about his environment that is as easy to interpret as possible, by contrast, a perspectival representation of the map data is often preferred. Optionally, the representation in this instance may contain elevation information about the not necessarily flat terrain or may merely be a three-dimensional representation of a "flat" map. The latter model is called a pseudo-3D representation. In both cases, the data of a vector map on which the map is based must be converted under the influence of a coordinate transformation into the image data containing a perspectival representation. Usually, a linear mapping specification is used, in which for lines existing in the map simply their end points are projected and in turn connected to a line. These lines then form polygons that must be filled. A standard CPU (central processing unit) or a GPU (graphical processing unit) executes the required 3D vector operations and polygon shadings in hardware.

The perspectival impression is achieved by choosing a virtual viewing position above the actual vehicle position. The higher the viewing position, the more information is presented to the user, which he would possibly not receive from his position in his vehicle. Often, the position of the vehicle is also represented on the map for better orientation.

In principle, any projection method that produces a spatial effect may be used for computing the image data. Particularly well-known in this context is the central projection, in which all points to be represented on the map are connected via connecting lines to a projection center, which coincides with the viewing position, the intersections between the connecting lines and a projection plane yielding the projected image. Due to the geometry of such or similar projections, a horizon appears in the visual representation, in the proximity of which the roads, fill areas etc. appear densely packed. The visual representation both in this area as well as in an area above the horizon, representing the air space, which often contains only decorative textures, contains only little information that is useful to the user of the navigation device.

SUMMARY OF THE INVENTION

An object of the present invention is to make more use of the mentioned areas near the horizon of the visual representation and to provide the user with supplementary information.

This object is achieved by a method and by a navigation device according to the present invention.

By drawing navigation or orientation-related information as image elements in the second area, a better use of the total area of a display device used for the visual representation of the digital roadmap is advantageously achieved.

A preferred refinement of the present invention provides for the navigation or orientation-related information to include short range instructions. This ensures that the user is provided with information about the terrain in which he is moving or in the immediate proximity of which he is located.

Furthermore, the navigation or orientation-related information preferably includes information about destinations or destination routes, that is, geographical elements of an individual nature. For this purpose, the user determines by input into the navigation device what is his travel destination and what route he would like to use in order to reach his travel destination. In addition, he may input intermediate destinations, at which he would like e.g. to pick up additional travelers or take a break. This individual information is represented in the area above the horizon, without obstructing the static information on the roadmap.

It is furthermore preferred that the navigation or orientation-related information includes the location of cities, in particular large cities, or traffic routes, in particular expressways, or also prominent or important places or roads. This makes it possible to represent elements having high importance in terms of traffic, in particular important traffic routes, even when they are a great geographical distance away from the current position of the vehicle and would scarcely be identifiable in the representation according to the related art. The traffic significance of various elements is either noted as a property on the roadmap or is determined as a function of the driver input.

In particular it is preferred that the navigation or orientation-related information is drawn above intersections between extended map elements concerning the information such as roads, destination routes, expressways or the like and a circle, whose center point is given by the vehicle position, or a line parallel to the horizon. If the projection or the topographical information at the basis of the computation of the visual representation also takes into account the earth's curvature, then the intersection of the extended map elements with the horizon may be computed as well. A possibly existing ambiguity is usefully resolved by choosing the point that is closer in the direction of travel. A resolution may also occur by a hierarchy of objects if the importance exists as a parameter.

Furthermore, the object of the present invention is achieved by the navigation device according to the present invention, which is distinguished by the fact that the converter unit includes means for drawing image elements having navigation or orientation-related information.

DETAILED DESCRIPTION

Figure 1:
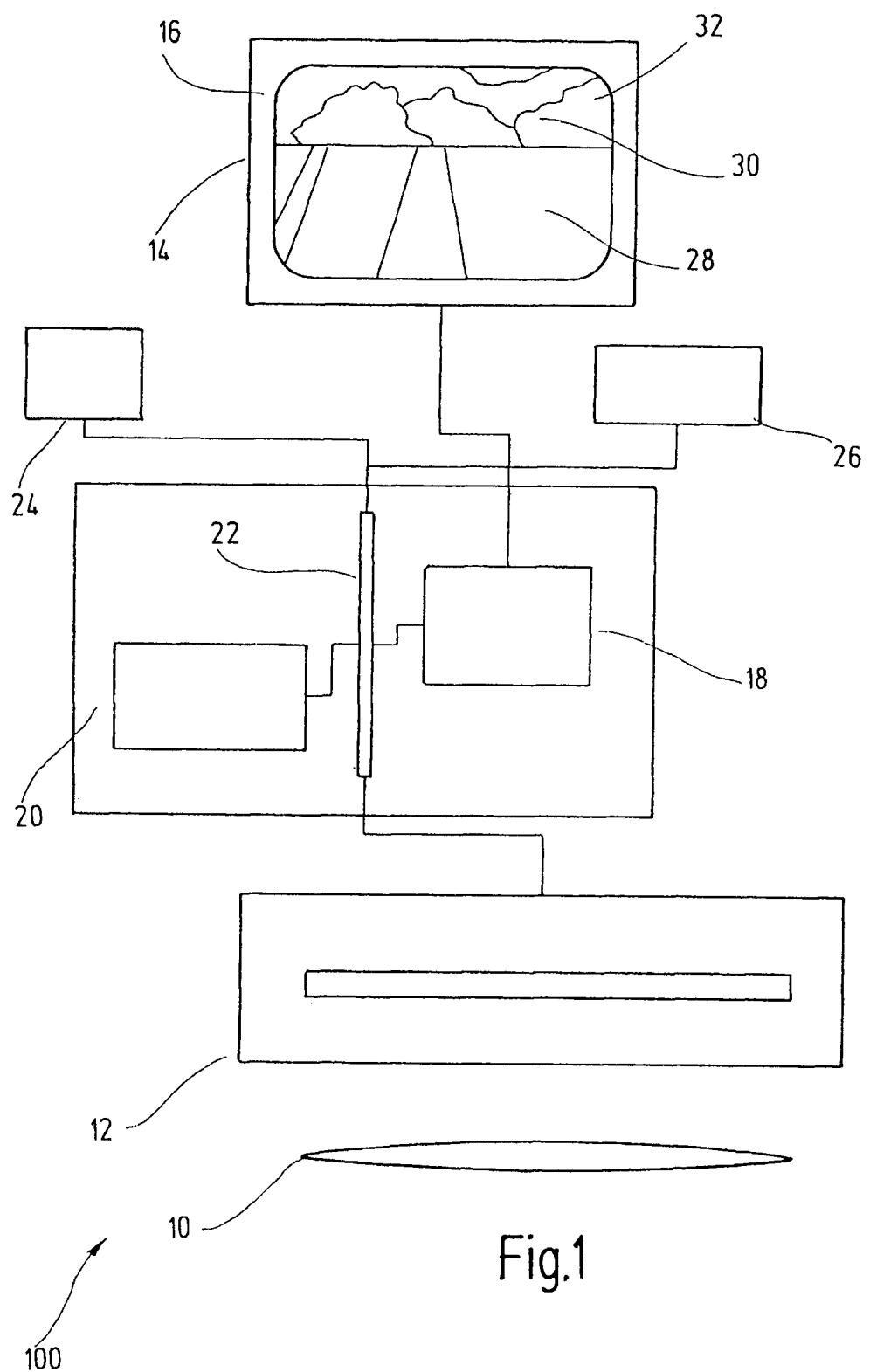
FIG. 1 shows a navigation device according to the present invention.

FIG. 1 shows a navigation device indicated as a whole by 100. The data of a digital roadmap are stored on a storage medium 10, for example, on a CD-ROM or a DVD, which is located in a disk drive 12. On a display device 14, a visual representation of digital roadmap 16 is shown, which is produced by a microprocessor 18, which computes the current position of the vehicle on the basis of measurement data that are ascertained by a position sensor 24 such as e.g. a GPS sensor and a direction measuring device 26 and which reads a part of the roadmap from storage medium 10 that includes the current position of the vehicle. Microprocessor 18, which is connected to a working memory 20 via a system bus 22, computes at regular time intervals perspectival images, which are adapted to the current position and orientation of the vehicle and which provide the driver of the vehicle with information about his immediate environment and the desired destination. The visual representation of digital roadmap 16 represented on display device 14 has a first area 28 containing the topographical information and a second area 32 separated from the first area by a horizon 30, which corresponds to the air space. The image conversion unit formed by microprocessor 18 and working memory 20 includes means for drawing image elements having navigation or orientation-related information, which are displayed in second area 32.

Figure 2:
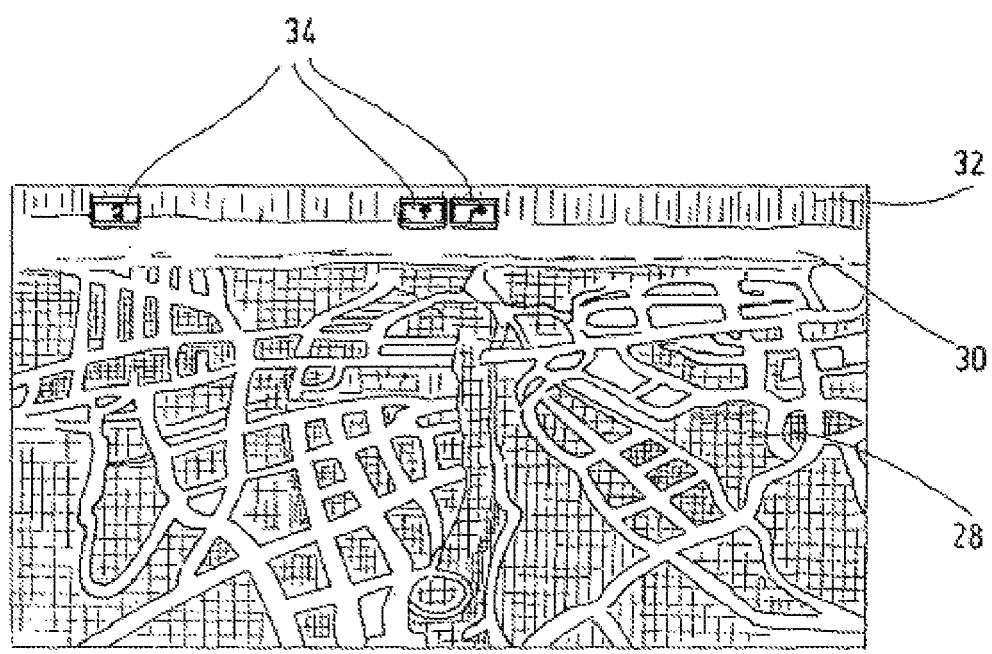
FIG. 2 shows a visual representation of a roadmap including information about expressways.
Figure 3:
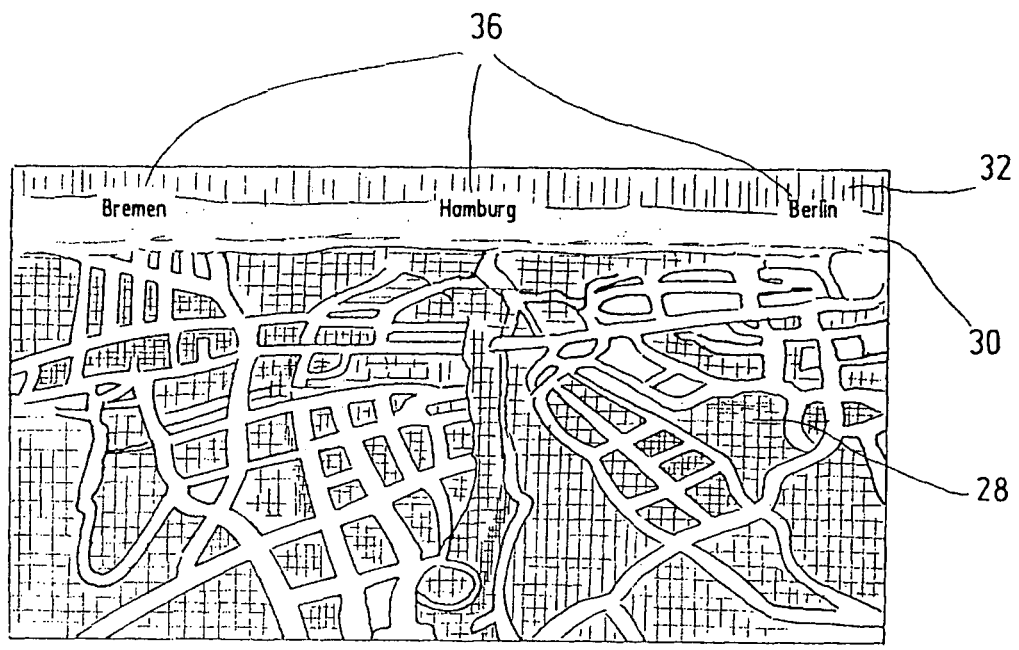
FIG. 3 shows a visual representation of a roadmap including information about the location of large cities.
Figure 4:
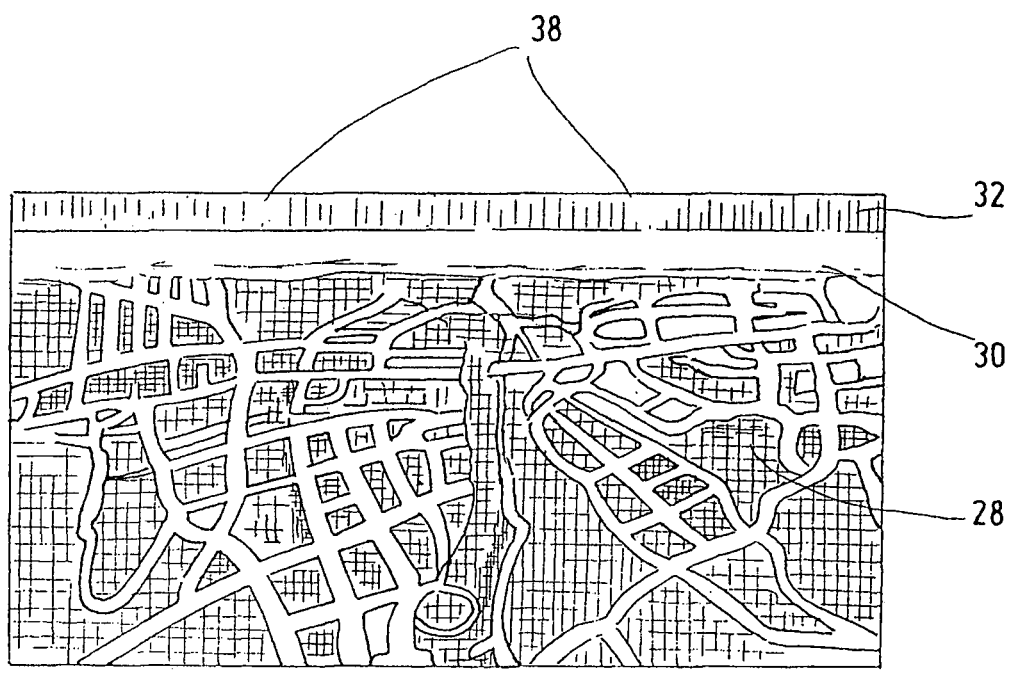
FIG. 4 shows a visual representation of a roadmap including an indication of cardinal points.

FIGS. 2, 3 and 4 show in more precise detail the visual representation of a roadmap 16.

Visual representation 16 is limited to a visual field in the direction of travel on the basis of an elevated virtual standpoint, laterally bounded by a given opening angle of the representation. The representation is not necessarily coupled to the direction of view or the direction of travel. A manual free rotation around the current position is also conceivable. First area 28 containing the topographical information provides a color representation of road segments and adjacent fill areas computed by using a coordinate transformation from data of a digital roadmap stored in the storage medium. The images displayed in display device 14 are periodically recomputed and represented. The method according to the present invention relates to each individual image of this kind. In second area 32 corresponding to the air space, navigation or orientation-related information is drawn as image elements. For this purpose, the suitable horizontal position for the respective information is ascertained from the orientation of the vehicle and the position of the information in the digital roadmap. This yields the position above horizon 30, in which the image elements are drawn.

In FIG. 2, image elements with information about the location of expressways 34 are displayed. Since traffic routes are extended, rather than punctiform, map elements, the intersection of a traffic route to be displayed and a circle, the center point of which is given by the position of the vehicle, or a line parallel to horizon 30 is determined. Preferably, those traffic elements are displayed, which are near a specified driving route 40, on which the vehicle is currently situated and/or which was computed by a route planner as the optimum route.

In FIG. 3, image elements having information about the location of large cities 36 are displayed. For this purpose, the distance between the displayed route and the optimum route determined by the navigation system represents a possible criterion for the selection. Large cities, which are located outside of the limited visual field lying in the direction of travel are represented on the outer edge of visual representation 16 and are provided with directional arrows.

In FIG. 4, image elements having information about cardinal points 38 are displayed.

Additional image elements, which provide the driver with useful information, relate to close range instructions such as e.g. requesting that the driver turn at an upcoming traffic intersection.

What is claimed is:

1. A method for a three-dimensional representation of at least a part of a digital roadmap in a navigation system, the method comprising:
   selecting topographical information from data stored in a storage medium as a function of a position and a direction of travel of a motor vehicle;
   converting the topographical information by using a coordinate transformation into a visual representation of the digital roadmap corresponding to a virtual elevated visual focus such that the visual representation of the digital roadmap has a first area containing the topographical information and a second area separated from the first area by a horizon; and
   in the second area, drawing at least one of navigation and orientation-related information as image elements;
   wherein the visual representation can be selectively controlled to freely rotate around the position of the motor vehicle instead of oriented in the direction of travel.

2. The method according to claim 1, wherein the navigation/orientation-related information includes instructions about an immediate vicinity of the motor vehicle.

3. The method according to claim 1, wherein the navigation/orientation-related information includes information about at least one of destinations and destination routes.

4. The method according to claim 1, wherein the navigation/orientation-related information includes a location of at least one of (a) cities, (b) large cities, (c) traffic routes, and (d) expressways.

5. The method according to claim 4, further comprising displaying cities whose ratio of their size to their geographical distance from the vehicle position exceeds a predetermined value.

6. The method according to claim 4, further comprising displaying cities that lie on a route chosen by a user.

7. The method according to claim 4, further comprising displaying major roads and places that lie on a route chosen by a user.

8. The method according to claim 1, wherein the navigation/orientation-related information includes cardinal points.

9. The method according to claim 1, wherein the navigation/orientation-related information is drawn above corresponding map elements, including at least one of cities and destinations.

10. The method according to claim 1, wherein the navigation/orientation-related information is drawn above intersections between (a) extended map elements corresponding to information including at least one of streets, destination routes, and expressways, and one of (b) a circle, whose center point is given by the vehicle position and (c) a line parallel to the horizon.

11. The method according to claim 1, wherein the visual representation is bound by opening angle.

12. A navigation device comprising:
   a display device;
   a position-determining unit;
   a storage medium, on which two-dimensional topographical information with a network of road segments are stored or capable of being stored;
   a conversion unit for converting the topographical information into a visual representation of a digital roadmap corresponding to a virtual, elevated visual focus, the conversion unit including means for drawing image elements having at least one of navigation and orientation-related information; and a control unit to selectively control the visual representation to freely rotate around a current position of the motor vehicle instead of oriented in a direction of travel.

13. The navigation device according to claim 12, wherein the navigation/orientation-related information includes instructions about an immediate vicinity of the motor vehicle.

14. The navigation device according to claim 12, wherein the navigation/orientation-related information includes information about at least one of destinations and destination routes.

15. The navigation device according to claim 12, wherein the navigation/orientation-related information includes a location of at least one of (a) cities, (b) large cities, (c) traffic routes, and (d) expressways.

16. The navigation device according to claim 15, further comprising displaying cities whose ratio of their size to their geographical distance from the vehicle position exceeds a predetermined value.

17. The navigation device according to claim 15, further comprising displaying cities that lie on a route chosen by a user.

18. The navigation device according to claim 15, further comprising displaying major roads and places that lie on a route chosen by a user.

19. The navigation device according to claim 12, wherein the navigation/orientation-related information includes cardinal points.

20. The navigation device according to claim 12, wherein the navigation/orientation-related information is drawn above corresponding map elements, including at least one of cities and destinations.

21. The navigation device according to claim 12, wherein the visual representation is bound by opening angle.

* * * * *

UNITED STATES PATENT AND TRADEMARK OFFICE
CERTIFICATE OF CORRECTION

PATENT NO. : 8,442,762 B2  
APPLICATION NO. : 11/918995  
DATED : May 14, 2013  
INVENTOR(S) : Thomas Jung It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1530 days.

Signed and Sealed this

Eighth Day of September, 2015

Michelle K. Lee  
*Director of the United States Patent and Trademark Office*